(12) United States Patent
Zeng et al.

(10) Patent No.: US 9,515,400 B2
(45) Date of Patent: Dec. 6, 2016

(54) MICRO SIM CARD CONNECTOR

(71) Applicant: Molex, LLC, Lisle, IL (US)

(72) Inventors: Shang-Xiu Zeng, Chengdu (CN); Hong Liang Wang, Chengdu (CN); Kian Heng Lim, Singapore (SG)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 14/704,534

(22) Filed: May 5, 2015

(65) Prior Publication Data

US 2016/0111801 A1    Apr. 21, 2016

(30) Foreign Application Priority Data

May 7, 2014    (CN) .......................... 2014 1 0191009

(51) Int. Cl.
*H01R 12/57*    (2011.01)
*H01R 12/70*    (2011.01)
*G06K 7/04*    (2006.01)
*H01R 13/24*    (2006.01)

(52) U.S. Cl.
CPC ............ *H01R 12/7076* (2013.01); *G06K 7/04* (2013.01); *H01R 12/57* (2013.01); *H01R 13/2478* (2013.01)

(58) Field of Classification Search
CPC .. H01R 13/2442; H01R 27/00; H01R 12/57; H01R 12/52; G06K 7/0021
See application file for complete search history.

(56) References Cited

U.S. PATENT DOCUMENTS

| | | | | |
|---|---|---|---|---|
| 6,053,776 A * | 4/2000 | Bricaud | ............... | G06K 7/0021 439/630 |
| 6,685,512 B2 * | 2/2004 | Ooya | ................... | G06K 7/0021 439/630 |
| 6,997,751 B2 * | 2/2006 | Miyamoto | ......... | H01R 13/2464 439/630 |
| 7,210,950 B2 | 5/2007 | Tanaka et al. | | |
| 7,247,062 B1 * | 7/2007 | Polnyi | .................... | H01R 13/26 439/862 |
| 7,481,686 B2 * | 1/2009 | Uchida | ............... | G06K 7/0021 439/630 |
| 7,494,381 B1 * | 2/2009 | Wu | ....................... | H01R 12/714 439/630 |
| 7,559,811 B1 * | 7/2009 | Polnyi | ................. | H01R 4/4809 439/591 |
| 7,575,479 B2 * | 8/2009 | Hung | ................... | G06K 7/0021 439/630 |
| 7,913,914 B2 | 3/2011 | Nilsson | | |
| 7,967,640 B2 | 6/2011 | Hashimoto et al. | | |
| 8,079,876 B2 * | 12/2011 | Wang | ................. | H01R 13/2442 439/630 |
| 8,821,191 B2 * | 9/2014 | Soo | ....................... | H01R 12/55 439/630 |
| 8,864,524 B2 | 10/2014 | Sato | | |
| 2002/0102882 A1 | 8/2002 | Tanaka | | |
| 2007/0224890 A1 * | 9/2007 | Chien | .................... | H01R 12/57 439/862 |

FOREIGN PATENT DOCUMENTS

CN    101752699 A    6/2010

* cited by examiner

*Primary Examiner* — Gary Paumen
(74) *Attorney, Agent, or Firm* — James A. O'Malley

(57) ABSTRACT

An electronic card connector comprises a terminal seat and a metal shell. The terminal seat comprises an insulative body having a plurality of receiving recessed portions and a plurality of terminals. The terminals can have a fixed unit, a pair of resilient arms, a contact portion and a soldering portion. The pair of resilient arms extend into the corresponding receiving recessed portion and are spaced apart from each other and are jointed with each other at distal ends, the contact portion is formed at the joint portion of the pair of resilient arms and the soldering portion is positioned between the pair of resilient arms. The metal shell comprises a top plate and resilient press unit. The resilient press unit comprises a resilient piece that includes two protruding portions that each obliquely intersect a card insertion direction.

29 Claims, 19 Drawing Sheets

MICRO SIM CARD CONNECTOR

RELATED APPLICATIONS

This application claims priority to Chinese Application No. 201410191009.5, filed May 7, 2014, which is incorporated herein by reference in its entirety.

FIELD OF THE PRESENT DISCLOSURE

The present disclosure relates to a terminal seat and an electrical connector, and more specifically to a terminal seat and an electronic card connector for electrically connecting an electronic card.

BACKGROUND OF THE PRESENT DISCLOSURE

A terminal of a connector for electrically connecting an electronic card generally has a resilient arm to resiliently contact a conductive pad of the electronic card, and the resilient arm must generate enough normal force to maintain a stable contact. Existing structure of the terminal is generally designed to make an outer profile of the terminal generally rectangular, which, for example, is disclosed in Chinese patent document published as CN103050806A.

Because the outer profile of the terminal is rectangular, and a plurality of terminals are arranged in a manner that the plurality of terminals are spaced apart from each other, a considerable space will be occupied by the plurality of terminals, which makes a dimension of the connector not easily reduced as a whole.

SUMMARY OF THE PRESENT DISCLOSURE

In an aspect, a terminal seat of the present disclosure comprises: an insulative body having a plurality of receiving recessed portions and a plurality of terminals. The plurality of terminals respectively correspond to the plurality of receiving recessed portions and are provided to the insulative body. Each terminal has a fixed unit, a pair of resilient arms, a contact portion and a soldering portion. The fixed unit is fixed to the insulative body, the pair of resilient arms extend into the corresponding receiving recessed portion from the fixed unit in a manner that the pair of resilient arms are spaced apart from each other and are jointed with each other at distal ends of the pair of resilient arms, the contact portion is formed at the joint portion of the pair of resilient arms, the solder portion extends from the fixed unit and is positioned between the pair of resilient arms.

In an embodiment, the contact portion has a curved shape and protrudes from surfaces of the pair of resilient arms.

In an embodiment, the plurality of receiving recessed portions each penetrate the insulative body.

In an embodiment, the fixed unit is a rectangular sheet piece, and the pair of resilient arms extend respectively from the fixed unit respectively adjacent to two ends of the fixed unit.

In an embodiment, the fixed unit comprises a first sheet body and a second sheet body which are spaced apart from each other, and the first sheet body is connected to one resilient arm and the soldering portion, and the second sheet body is connected to the other resilient arm.

In an embodiment, the plurality of terminals are divided into two terminal groups, each terminal group has at least three terminals, the terminals in each terminal group are arranged so that a central position of each terminal is positioned on one apex of a polygon and the contact portions of all the terminals are aligned with a straight line.

In an embodiment, each terminal group has three terminals and the central position of each terminal is positioned on one apex of a triangle.

In an embodiment, each terminal group has four terminals and the central position of each terminal is positioned on one apex of a quadrilateral.

In another aspect, a terminal seat of the present disclosure comprises an insulative body having a plurality of receiving recessed portions and a plurality of terminals. The plurality of terminals respectively correspond to the plurality of receiving recessed portions and are provided to the insulative body, each terminal has a fixed unit, a pair of resilient arms, a contact portion and a soldering portion, the fixed unit is fixed to the insulative body, the pair of resilient arms extend into the corresponding receiving recessed portion from the fixed unit in a manner that the pair of resilient arms are spaced apart from each other and are jointed with each other at distal ends of the pair of resilient arms, the contact portion is formed at the joint portion of the pair of resilient arms, the soldering portion extends from the fixed unknit, the plurality of terminals are divided into two terminal groups, each terminal group has at least three terminals, the terminals in each terminal group are arranged so that a central position of each terminal is positioned on one apex of a polygon and the contact potions of all the terminals are aligned with a straight line.

An electronic card connector can include a terminal seat and a metal shell. The metal shell cooperatively defines a card insertion space with the terminal seat, and the contact portions of the plurality of terminals protrude toward the card insertion space, the metal shell comprises a top plate which is spaced apart from and faces the insulative body and a resilient press unit which is formed to the top plate, the resilient press unit corresponds to the terminal seat in position and comprises at least a resilient piece, the each resilient piece extends from the top plate toward the card insertion space and has a press portion extending into the card insertion space and two oblique portions, the two oblique portions are respectively positioned on a front side and a rear side of the press portion along a card insertion direction and each obliquely intersect the card insertion direction.

In an embodiment, the press portion is a rectangular shape extending parallel to the card insertion direction, and the two oblique portions are respectively connected to two ends of the press portion.

In an embodiment, each resilient piece further has two protruding portions which each protrude from the press portion toward the card insertion space, and the two protruding portions are respectively positioned close to the two ends of the press portion.

In an embodiment, the electronic card connector further comprises another terminal seat, and the two terminal seats are sequentially arranged along the card insertion direction, the metal shell and the two terminal seats cooperatively define the card insertion space, and the metal shell further comprises another resilient press unit, the two resilient press units correspond to the two terminal seats respectively in position and are sequentially arranged along the card insertion direction.

BRIEF DESCRIPTION OF THE FIGURES

The other features and effects of the present disclosure will be apparent through embodiments with reference to the Figures, and in Figures.

DETAILED DESCRIPTION

Figure 1:
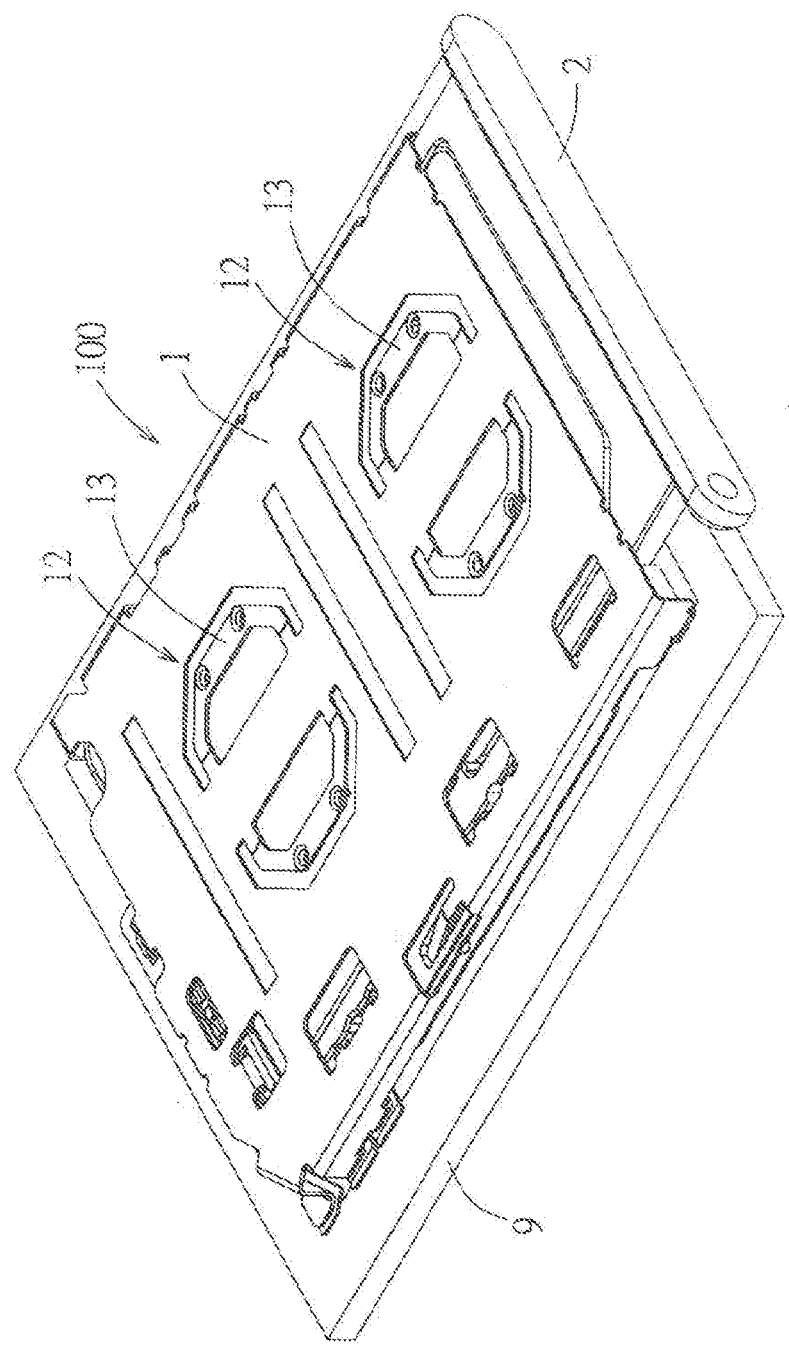
FIG. 1 is a perspective view illustrating a first embodiment of an electronic card connector of the present disclosure.

Before the present disclosure is described in detail, it should be noted that similar element is indicated by the same reference numeral in the following description.

As can be appreciated, an object of the present disclosure is to provide a terminal seat which has a smaller dimension. Another object of the present disclosure is to provide an electronic card connector which has a smaller dimension and allows an electronic card to be smoothly inserted into or ejected from the electronic card connector. As can be appreciated, the effects of the present disclosure are as follows. Since the terminal has a pair of resilient arms, the terminal can apply a larger normal force, and since the soldering portion is positioned between the two resilient arms, a space can be sufficiently used, not only the dimension of the terminal itself can be reduced but also it facilitates arrangement of the plurality of terminals in a stagger manner, and in turn the dimension of the terminal seat is reduced as a whole and the dimension of the electronic card connector is reduced as a whole. Moreover, by that the two oblique portions are respectively positioned on the front side and the rear side of the press portion along the card insertion direction and each obliquely intersect the card insertion direction, the resilient press unit of the metal shell can prevent the resilient piece from hooking the tray, and thus can allow the tray to move smoothly while the tray is inserted into or ejected from the card insertion space.

Referring to FIG. 1 through FIG. 4, an electronic card connector 100 of a first embodiment of the present disclosure is provided on a circuit board 9 and may allow two electronic cards 8 to be electrically connected. The electronic card connector 100 comprises two terminal seats 10, a metal shell 1, a tray 2 and a card ejecting mechanism 3. Two terminal seats 10 and the metal shell 1 are fixed to the circuit board 9 and cooperatively define a card insertion space 101. Two terminal seats 10 are sequentially arranged along a card insertion direction D. The tray 2 is used to carry the electronic cards 8, so as to facilitate insertion or ejection of an electronic card, and when the tray 2 is inserted into the card insertion space 101, the two electronic cards 8 respectively correspond to the two terminal seats 10 so as to establish electrical connections. The card ejecting mechanism 3 comprises a push rod 31 and a lever member 32 which are used to eject the tray 2 from the card insertion space 101.

Figure 9:
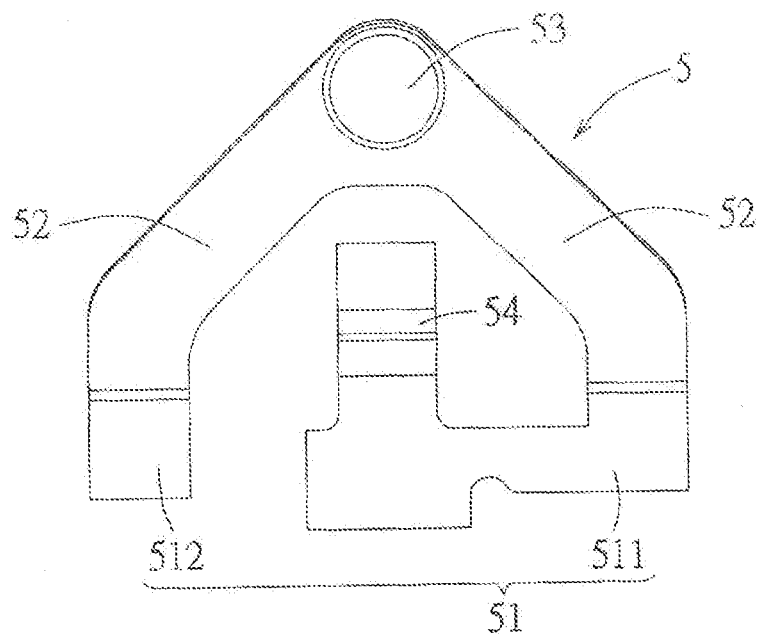
FIG. 9 and FIG. 10 respectively illustrate top views of another two alternative structures the terminals of the first embodiment.
Figure 10:
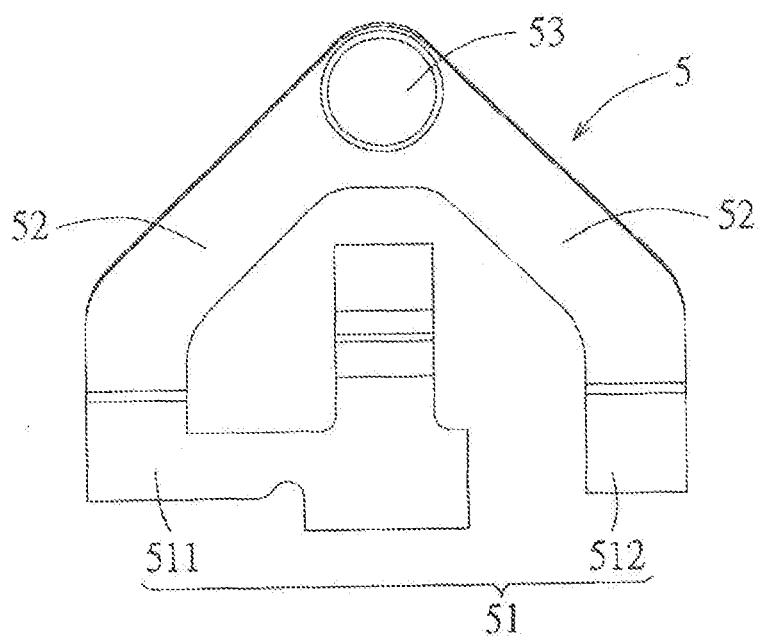

Referring to FIG. 5 through FIG. 8, the each terminal seat 10 comprises an insulative body 4 and a plurality of terminals 5. The insulative body 4 has a plurality of receiving recessed portions 41, the plurality of receiving recessed portions 41 each penetrate the insulative body 4. The plurality of terminals 5 respectively correspond to the plurality of receiving recessed portions 41 and provided to the insulative body 4. The each terminal 5 has a fixed unit 51, a pair of resilient arms 52, a contact portion 53 and a soldering portion 54. The fixed unit 51 is fixed to the insulative body 4. The pair of resilient arms 52 extend into the corresponding receiving recessed portions 41 from the fixed unit 51 in a manner that the pair of resilient arms 52 are spaced apart from each other, and are jointed together at distal ends thereof. The contact portion 53 is formed at the jointed portion between the pair of resilient arms 52. The soldering portion 54 extends from the fixed unit 51 and a connection position between the soldering portion 54 and the fixed unit 51 is positioned between two connection positions between the pair of resilient arms 52 and the fixed unit 51. Specifically, in the embodiment, the fixed unit 51 is a rectangular sheet piece and most of the fixed unit 51 is embedded in the insulative body 4. The pair of resilient arms 52 extend from the fixed unit 51 respectively adjacent to two ends of the fixed unit 51. The contact portion 53 has a curved shape and protrudes from surfaces of the pair of resilient arms 52 toward the card insertion space 101. The soldering portion 54 and the contact portion 53 are positioned on the same side of the fixed unit 51 and positioned between the pair of resilient arms 52. The contact portion 53 is supported by the two resilient arms 52, so the contact portion 53 can apply a larger normal force on the electronic card 8 and in turn can stably contact the electronic card 8, and the receiving recessed portion 41 provides a space for displacements of the two resilient arms 52 due to a pressure from the electronic card 8. In an alternative structure, the fixed unit 51 may comprise a first sheet body 511 and a second sheet body 512 which are spaced apart from each other (referring to FIG. 9 and FIG. 10), and the first sheet body 511 is connected to one resilient arm 52 and the soldering portion 54, and the second sheet body 512 is connected to the other resilient arm 52. FIG. 9 and FIG. 10 respectively illustrate two alternative structures, the first sheet body 511 is connected to the resilient arm 52 on the right and the second sheet body 512 is connected to the resilient arm 52 on the left in FIG. 9, and the first sheet body 511 is connected to the resilient arm 52 on the left and the second sheet body 512 is connected to the resilient arm 52 on the right in FIG. 10.

Figure 11:
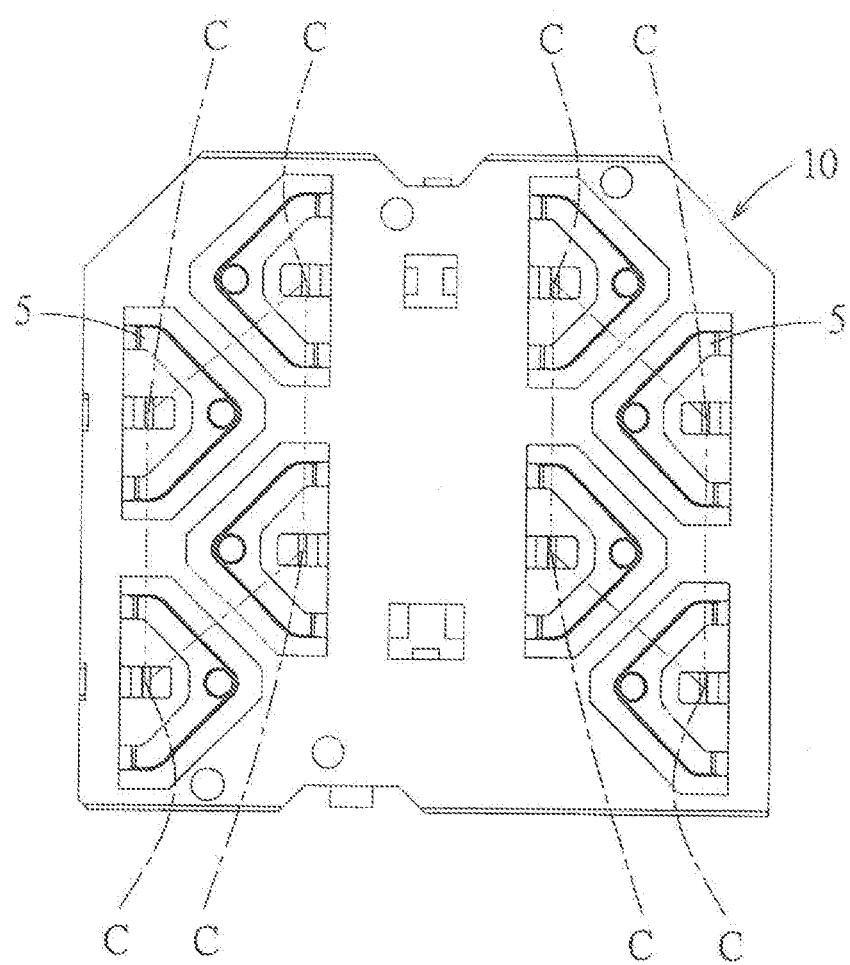
FIG. 11 is a top view illustrating another arrangement manner of the terminals of the terminal seat of the first embodiment.
Figure 12:
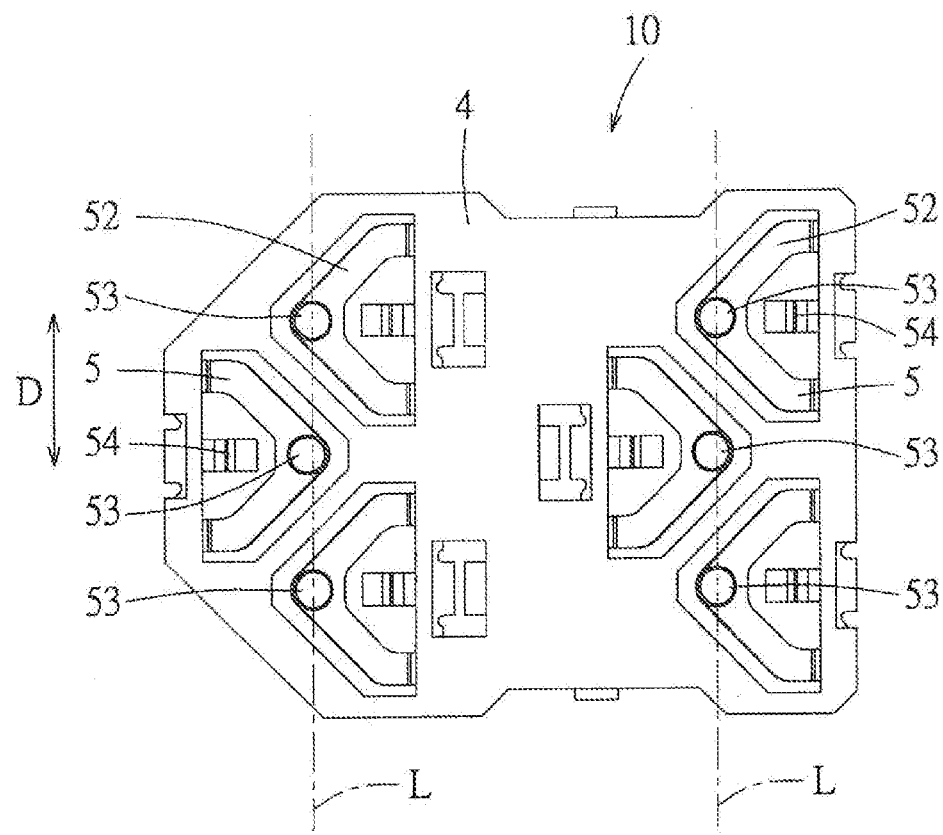
FIG. 12 is a top view illustrating the terminals of the terminal seat of the first embodiment in which each terminal group has three terminals.
Figure 13:
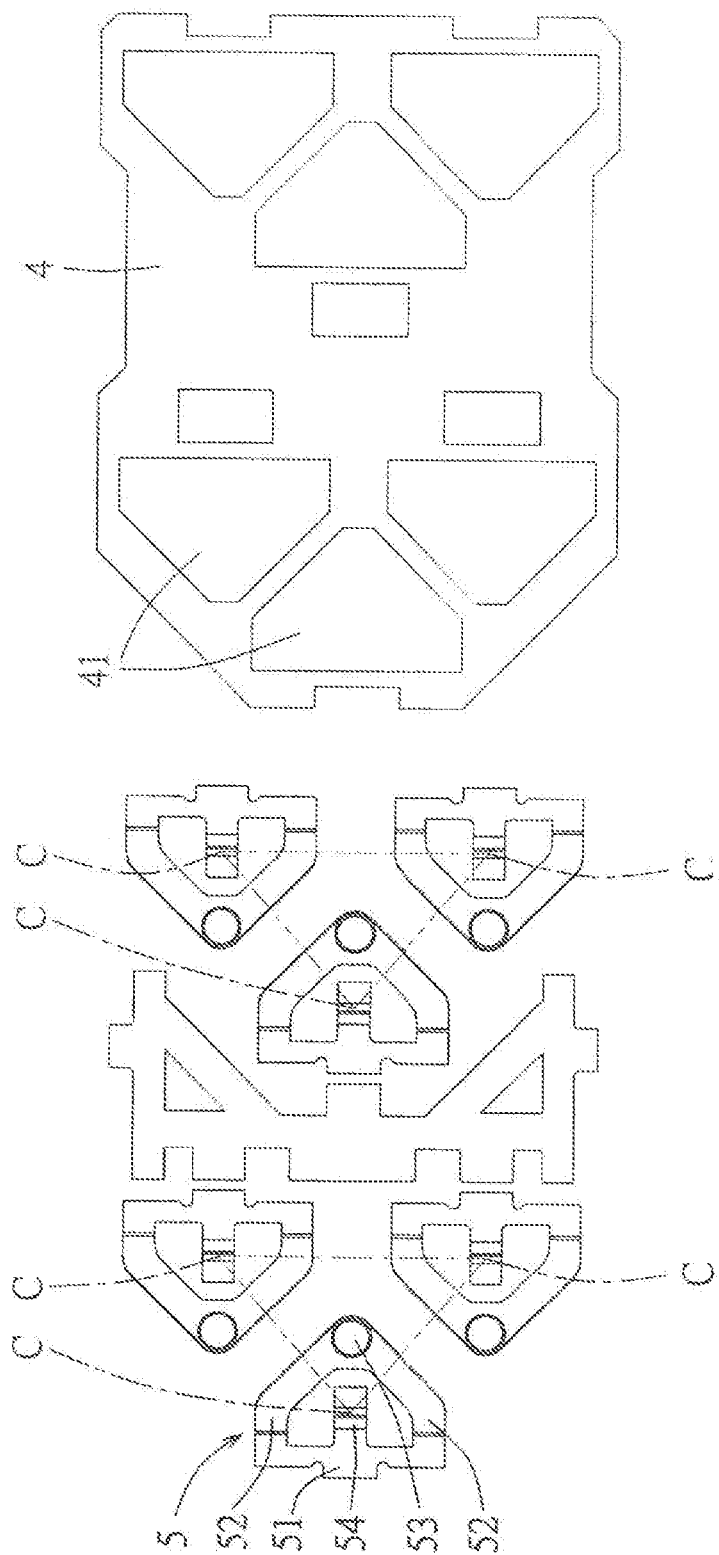
FIG. 13 is an exploded view illustrating the terminals of the terminal seat of the first embodiment in which each terminal group has three terminals.
Figure 14:
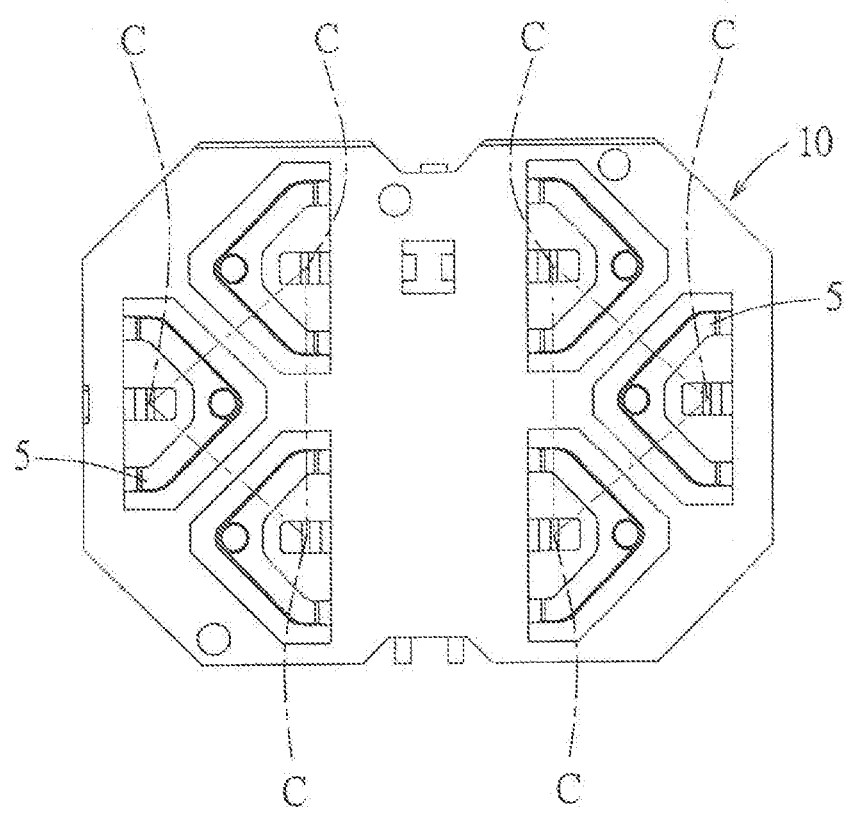
FIG. 14 is a view similar to FIG. 12 and illustrating another arrangement manner of the terminals.

Moreover, the soldering portion 54 is positioned between the pair of resilient arms 52 so that a space can be sufficiently used, making the terminal 5 generally triangle as a whole, not only reduces a dimension of the terminal 5 itself but also facilitates arrangement of the plurality of terminals 5 in a stagger manner, and in turn reduces a dimension of the terminal seat 10 as a whole. In the embodiment, The plurality of terminals 5 are divided into two terminal groups, each terminal group has four terminals 5; in each terminal group, four terminals 5 are arranged so that a central position C of the each terminal 5 is positioned on one apex of a quadrilateral and the contact portions 53 of the four terminals 5 are aligned with a straight line L, and the straight line L is parallel to the card insertion direction D, so as to allow the each resilient arm 52 of the each terminal 5 to obliquely intersect the card insertion direction D, therefore, when the tray 2 is inserted into or ejected from the card insertion space 101, the tray 2 will not hook the each terminal 5, so as to prevent the each terminal 5 from being damaged. Referring to FIG. 11, the two terminal groups may be in mirror symmetry to each other in the arrangement manner of the terminals 5. Referring to FIG. 12 and FIG. 13, in another arrangement manner, the each terminal group has three terminals 5, the central position C of the each terminal 5 is positioned on one apex of a triangle and the contact portions 53 of the three terminals 5 are aligned with a straight line L. In other words, according to the structure of the terminals 5 of the embodiment, the terminals 5 in the each terminal group may be arranged so that the central position C of the each terminal 5 is positioned on one apex of a polygon and the contact portions 53 of all the terminals 5 are aligned with a straight line L, so that the terminals 5 in the each terminal group may be arranged closely, and in turn a dimension of the terminal seat 10 may be reduced as a whole. Similarly, referring to FIG. 14, when the each terminal group has three terminals 5, the two terminal groups may be in mirror symmetry to each other in the arrangement manner of the terminals 5.

Figure 2:
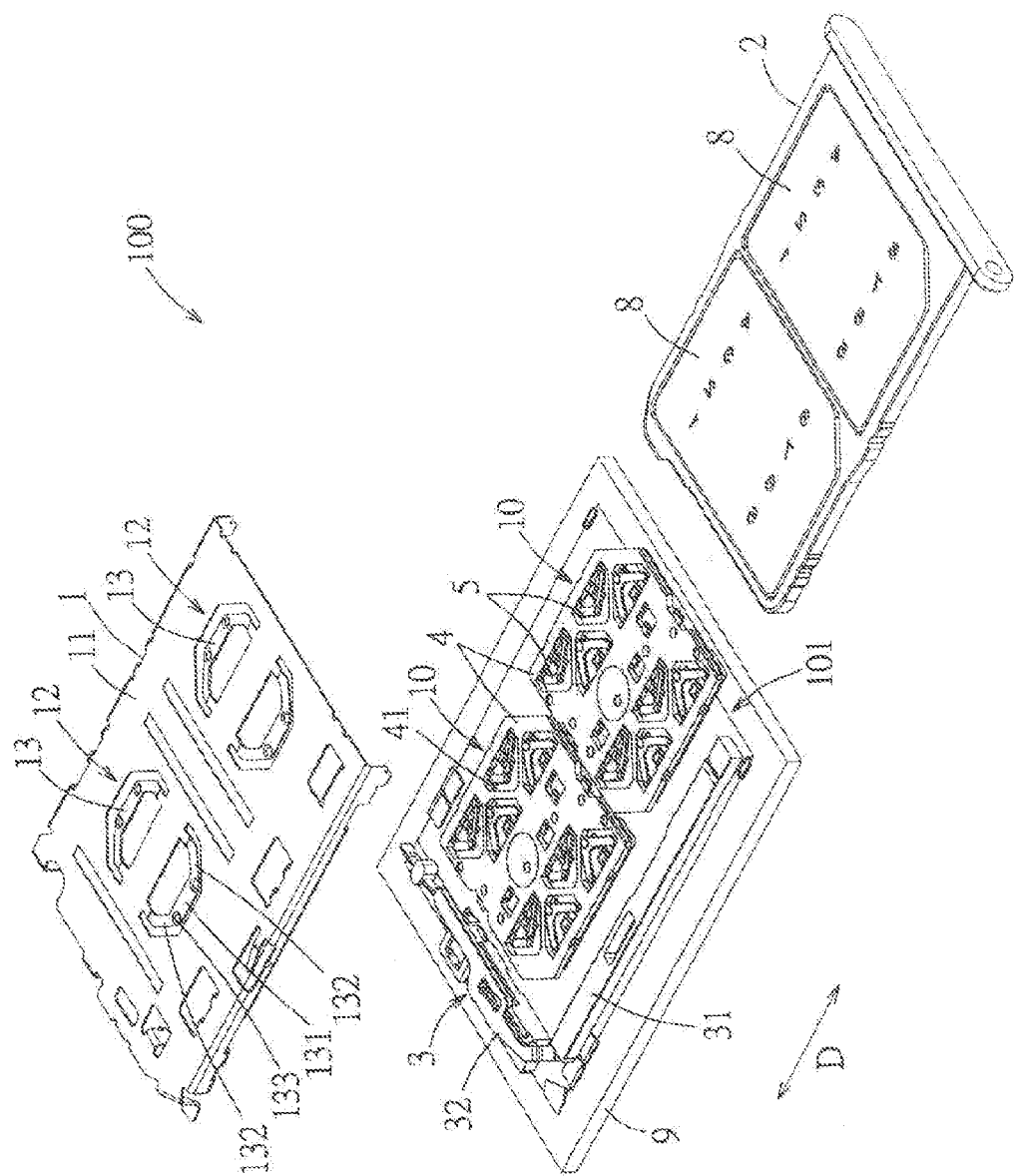
FIG. 2 is an exploded perspective view illustrating an assembling relationship among components of the first embodiment.
Figure 3:
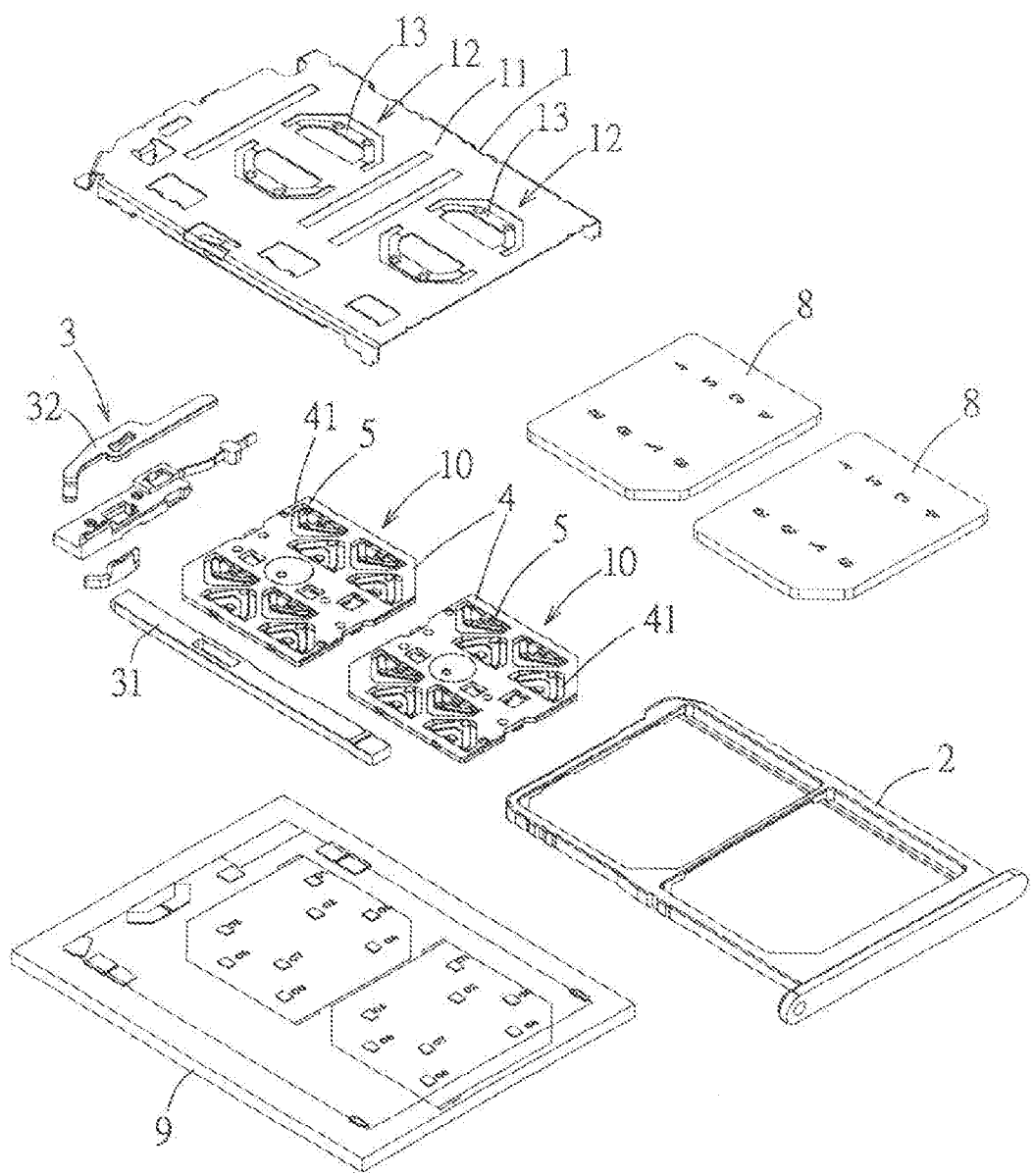
FIG. 3 is a further exploded view of FIG. 2 illustrating components of the first embodiment.
Figure 4:
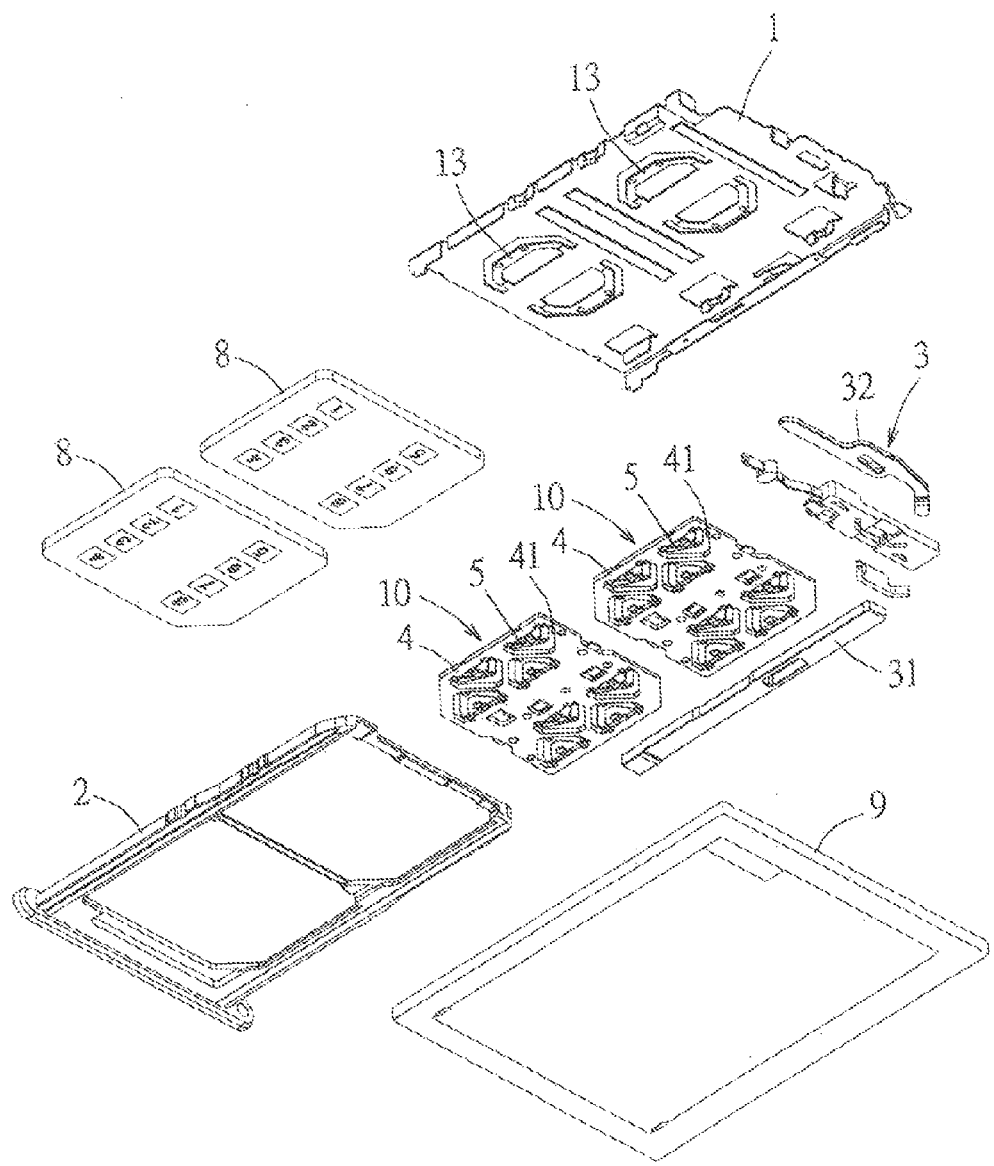
FIG. 4 is a view of FIG. 3 viewed from another angle.
Figure 5:
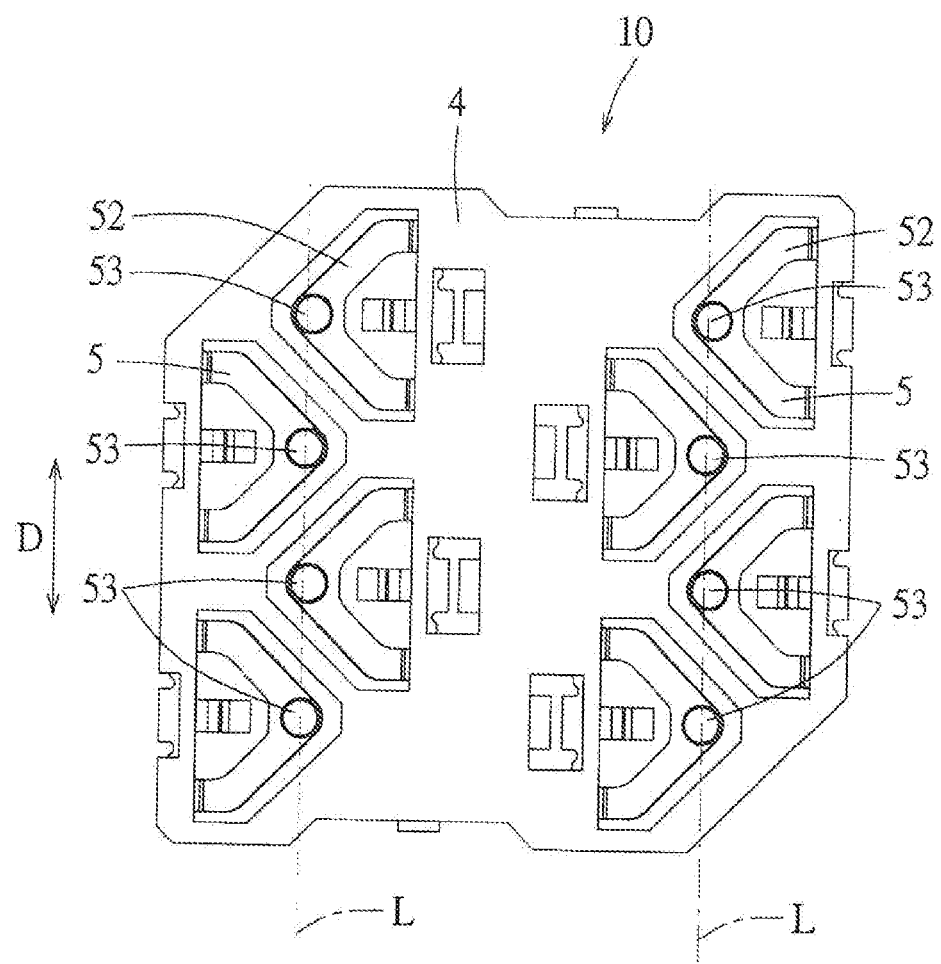
FIG. 5 is a top view illustrating a terminal seat of the first embodiment.
Figure 6:
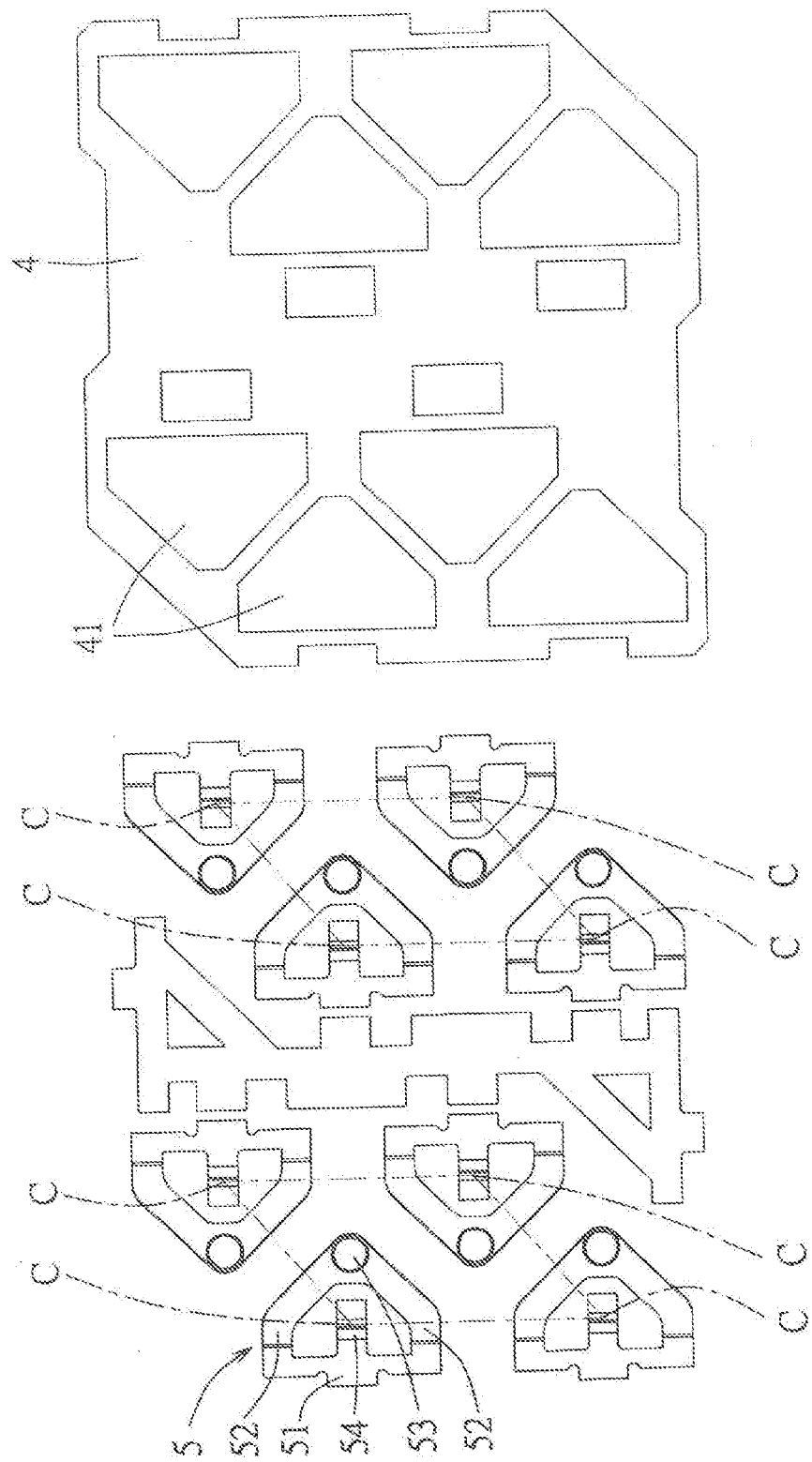
FIG. 6 is an exploded view illustrating an insulative body and terminals of the terminal seat.
Figure 7:
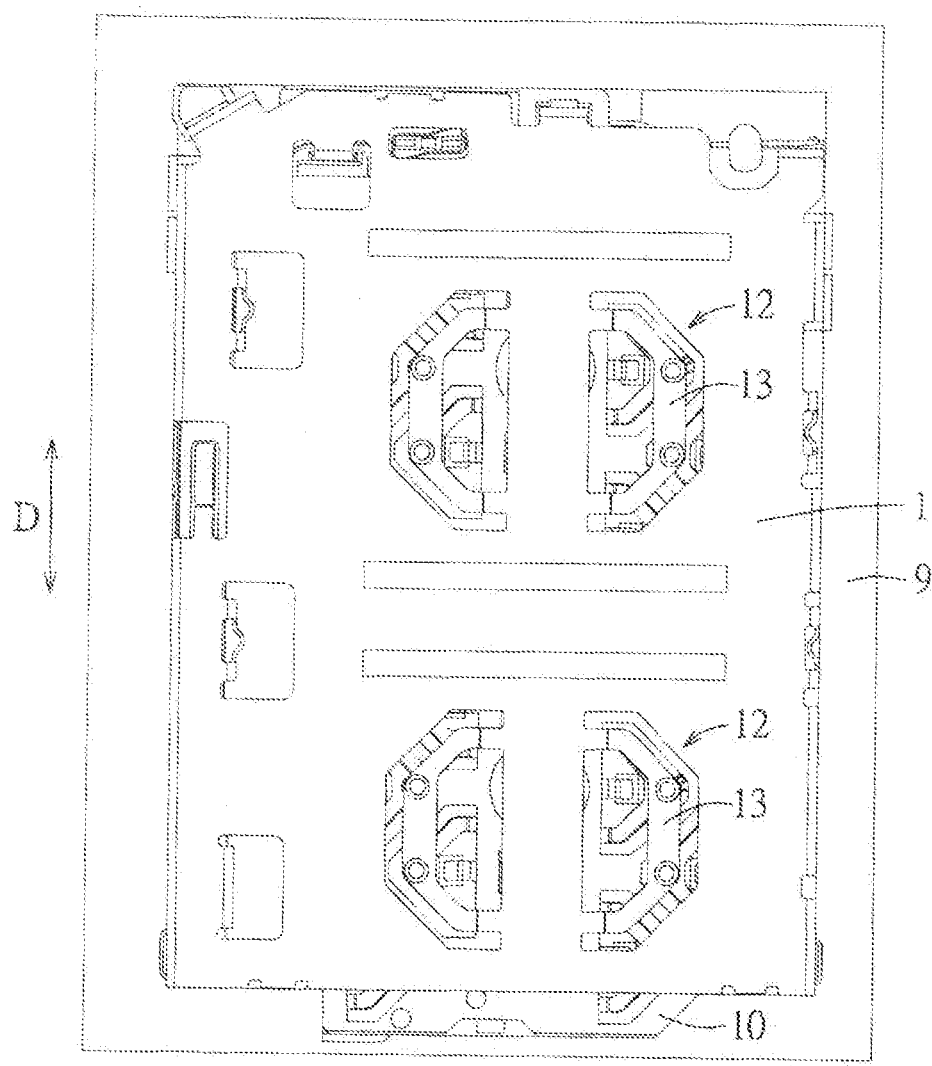
FIG. 7 is a top view illustrating the first embodiment.
Figure 8:
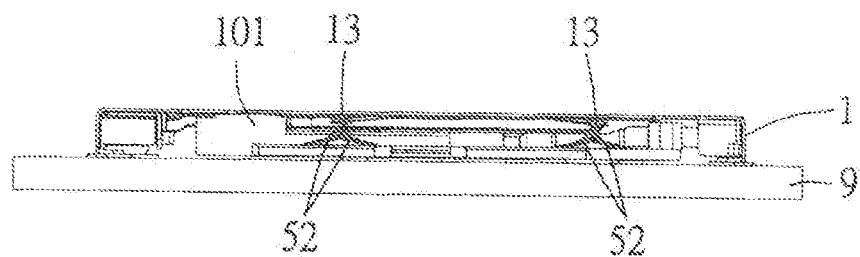
FIG. 8 is a side view illustrating that the terminals of the first embodiment extend into a card insertion space.
Figure 15:
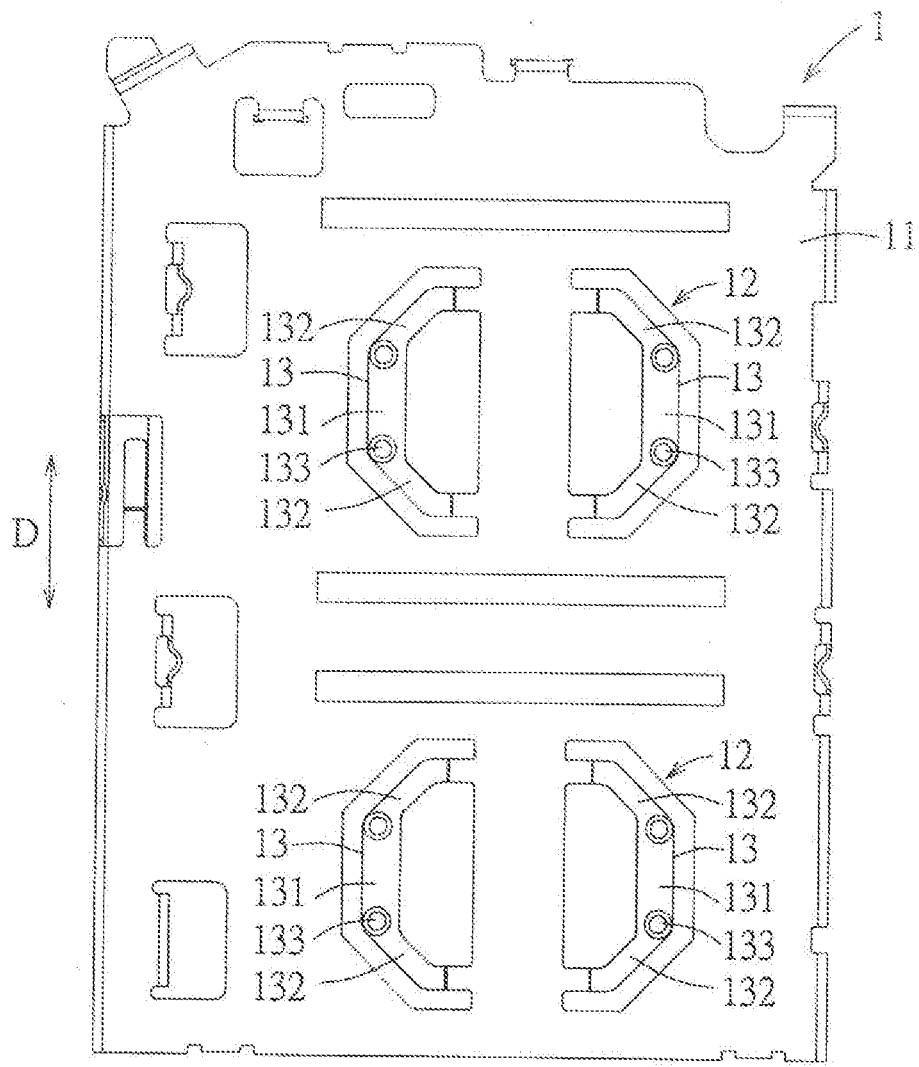
FIG. 15 is a top view illustrating a metal shell of the first embodiment.
Figure 16:
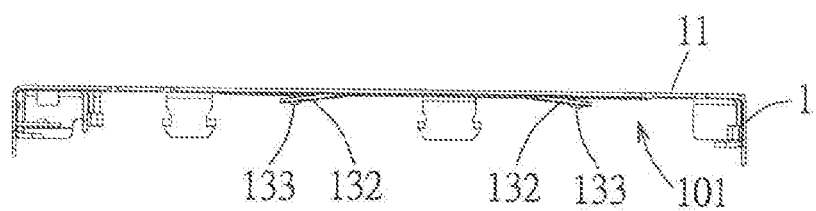
FIG. 16 is a side view illustrating that a resilient piece of the metal shell of the first embodiment extends into the card insertion space.
Figure 17:
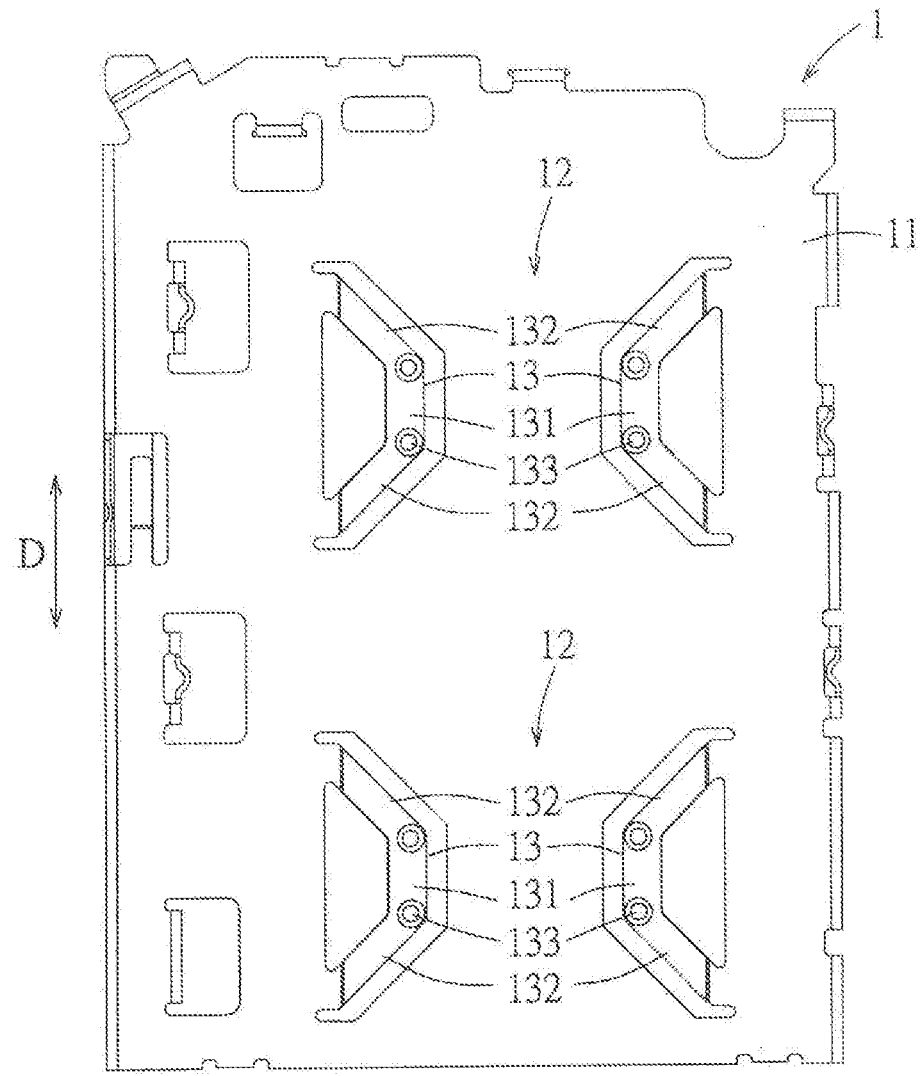
FIG. 17 is a top view illustrating another arrangement manner of the resilient pieces of the metal shell of the first embodiment.
Figure 18:
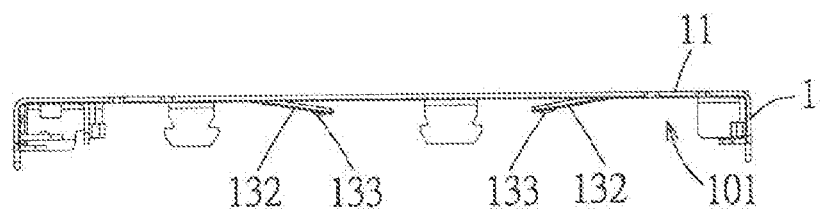
FIG. 18 is a side view illustrating that the resilient piece in the another arrangement manner extends into the card insertion space.

Referring to FIG. 2, FIG. 15 and FIG. 16, the metal shell 1 comprises a top plate 11 which is spaced apart from and faces the insulative body 4 and two resilient press units 12 which are formed to the top plate 11, the two resilient press units 12 correspond to the two terminal seats 10 respectively in position and are sequentially arranged along the card insertion direction D so as to resiliently press against the two electronic cards 8 respectively, and in turn to allow the each electronic card 8 to stably contact the contact portions 53 of the corresponding terminals 5. The each resilient press unit 12 comprises two resilient pieces 13 provided in left-right symmetry, the each resilient piece 13 extends from the top plate 11 toward the card insertion space 101, and has a press portion 131 extending into the card insertion space 101, two oblique portions 132 and two protruding portions 133. The two oblique portions 132 are respectively positioned on a front side and a rear side of the press portion 131 along the card insertion direction D and each obliquely intersect the card insertion direction D. Specifically, the press portion 131 is a rectangular shape extending parallel to the card insertion direction D, and the two oblique portions 132 are respectively connected to the two ends of the press portion 131 The two protruding portions 133 each protrude from the press portion 131 toward the card insertion space 101 in a curved shape, and the two protruding portions 133 are respectively positioned close to the two ends of the press portion 131, so as to contact and press against the electronic card 8. By that the two oblique portions 132 are respectively positioned on the front side and the rear side of the press portion 131 along the card insertion direction D and each obliquely intersect the card insertion direction D, it can prevent the resilient piece 13 from hooking the tray 2 and thus can allow the tray 2 to move smoothly while the tray 2 is inserted into or ejected from the card insertion space 101. In the embodiment, although the each resilient press unit 12 comprises two resilient pieces 13 provided in left-right symmetry, however only one resilient piece 13 may be also used. Also, except that the press portions 131 of the two resilient pieces 13 may be provided toward opposite directions, referring to FIG. 17 and FIG. 18, the two press portions 131 of the two resilient pieces 13 may be provided so that the two press portions 131 face each other.

Figure 19:
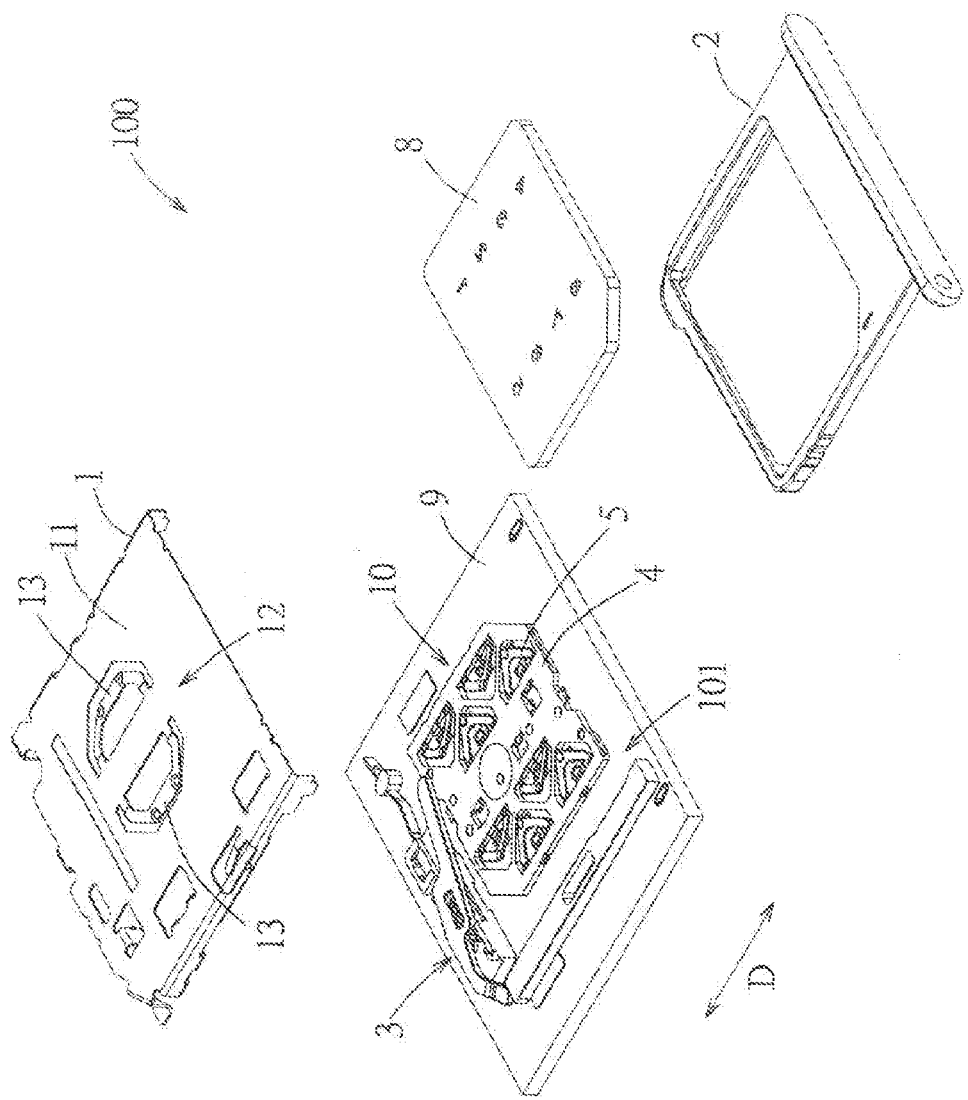
FIG. 19 is an exploded perspective view illustrating a second embodiment of the electronic card connector of the present disclosure.

Referring to FIG. 19, a second embodiment of the electronic card connector 100 of the present disclosure is substantially the same as the first embodiment, and has only one difference that, in the second embodiment, only one terminal seat 10 is provided and only one resilient press unit 12 is provided so as to allow only one electronic card 8 to insert. The electronic card connector 100 may be also designed without the tray 2, so that the electronic card 8 is directly inserted. Similarly, the two oblique portions 132 of the resilient piece 13 can prevent the resilient piece 13 from hooking the electronic card 8 and thus can allow the electronic card 8 to move smoothly while the electronic card 8 is inserted into or ejected from the card insertion space 101.

Figure 20:
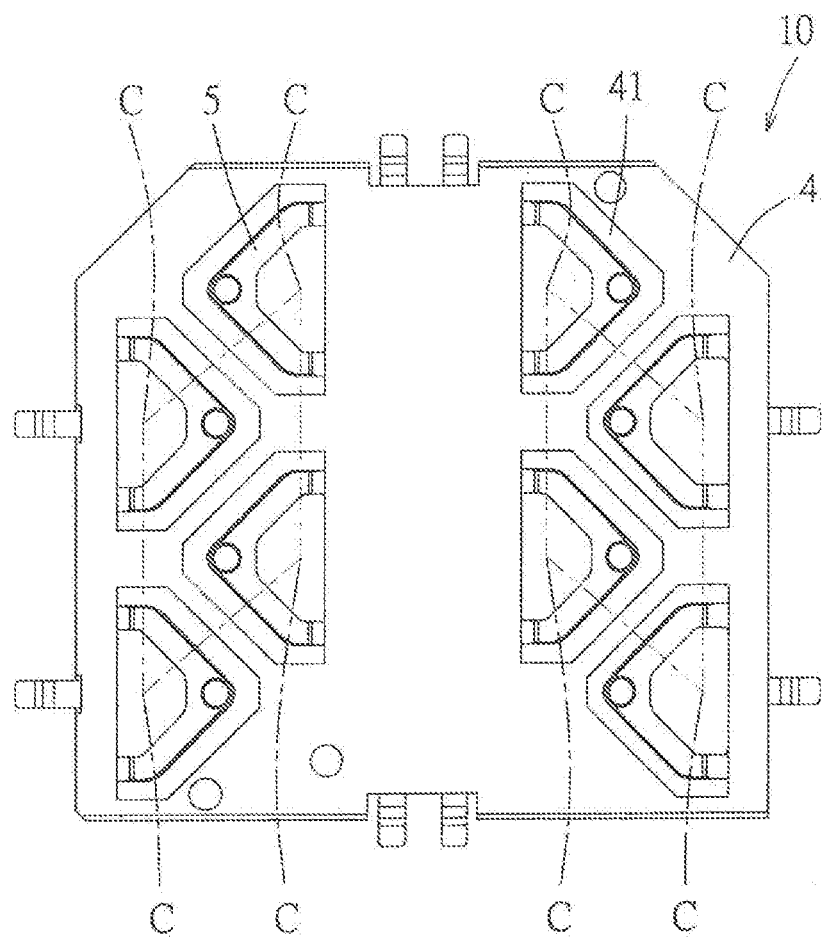
FIG. 20 is a top view illustrating a terminal seat of a third embodiment of the electronic card connector of the present disclosure.
Figure 21:
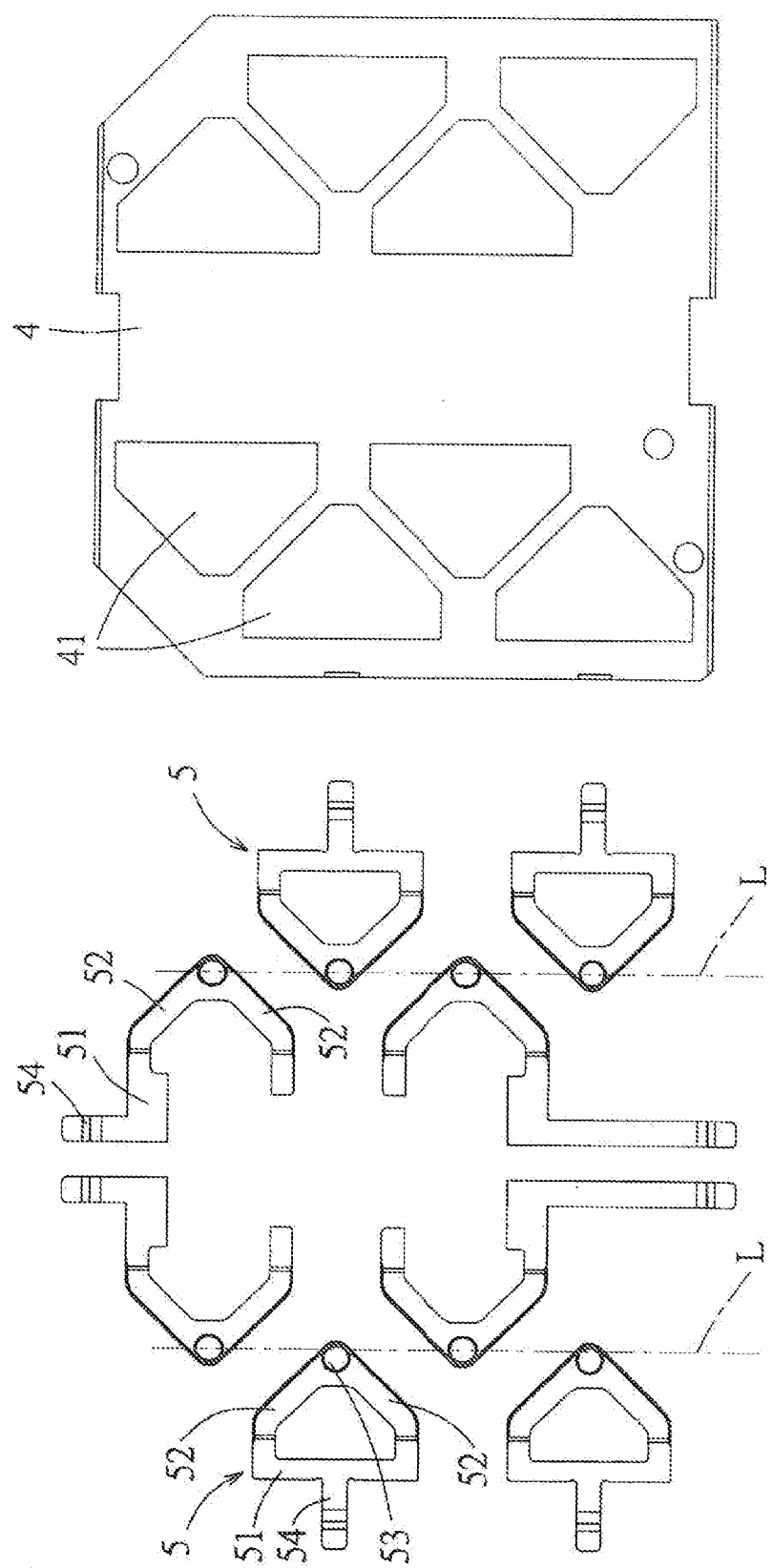
FIG. 21 is an exploded view illustrating an insulative body and terminals of the terminal seat.
Figure 22:
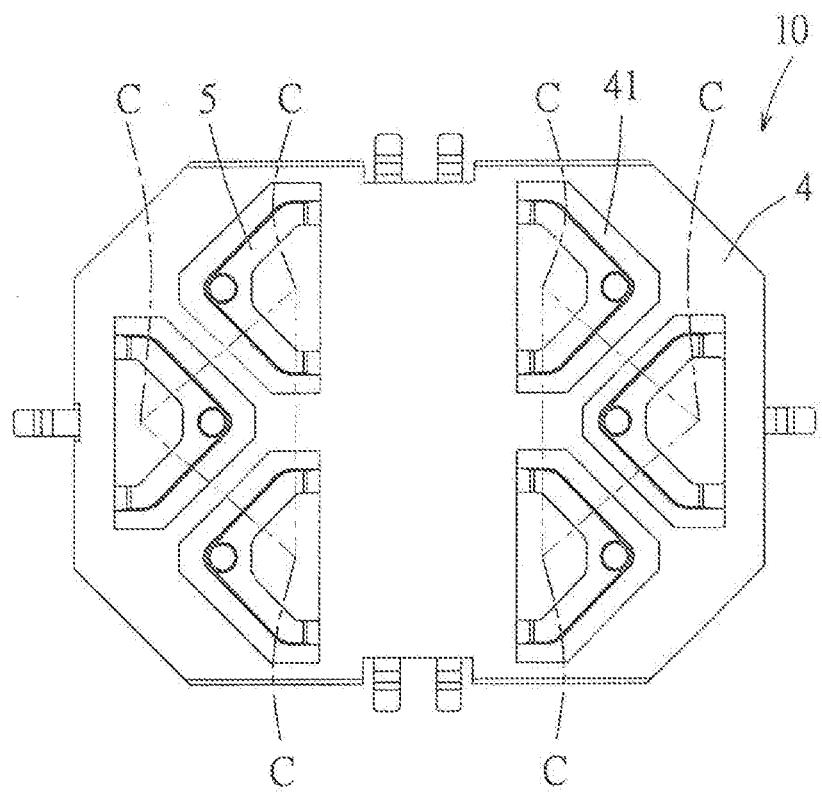
FIG. 22 is a top view illustrating the terminals of the terminal seat of the third embodiment in which each terminal group has three terminals.
Figure 23:
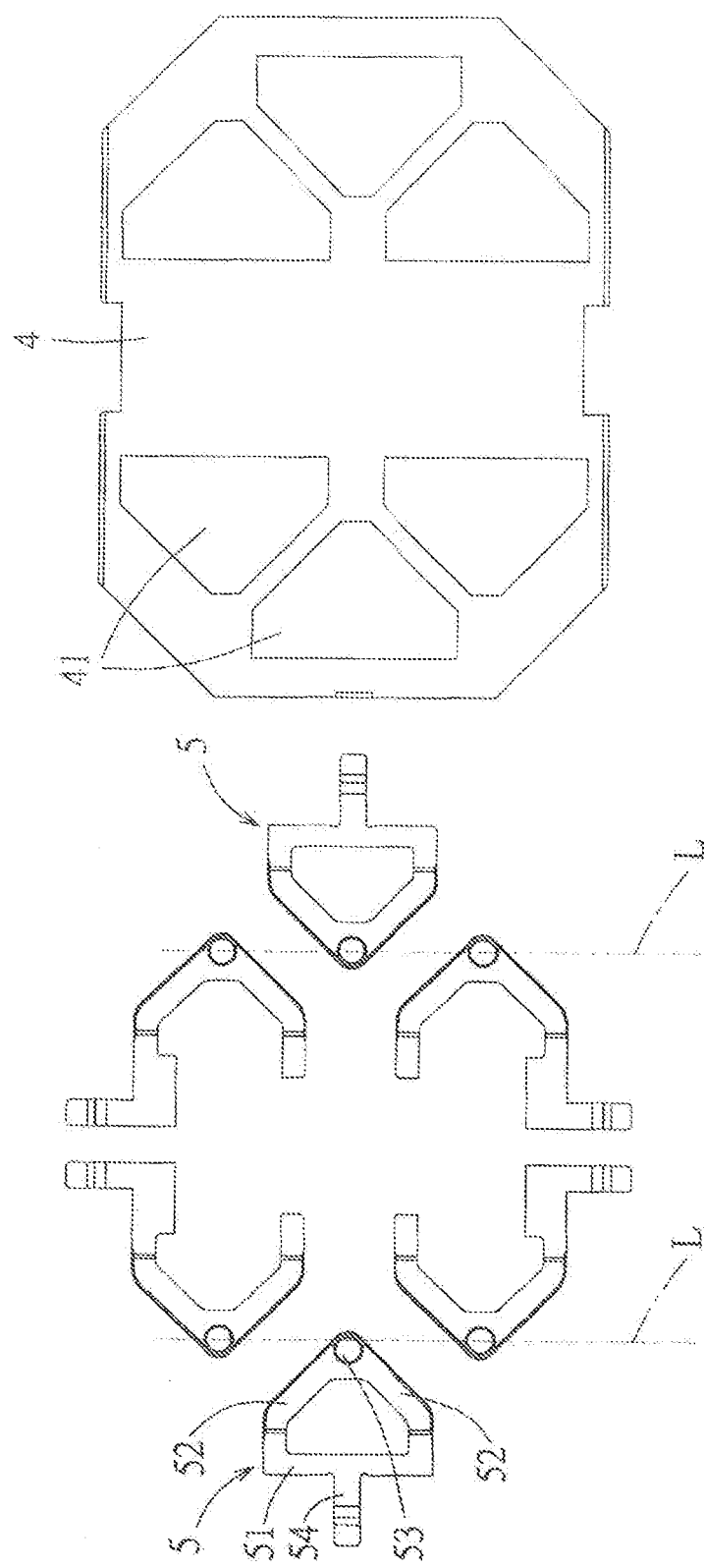
FIG. 23 is an exploded view illustrating the terminals of the terminal seat of the third embodiment in which each terminal group has three terminals.

Referring to FIG. 20 and FIG. 21, a third embodiment of the electronic card connector 100 of the present disclosure is substantially the same as the first embodiment, and has only one difference that, in the third embodiment, the soldering portion 54 and the contact portion 53 of the terminal 5 are not positioned on the same side of the fixed unit 51, however, the two terminal groups still can attain the effect of reducing the dimension of the terminal seat 10 as a whole when the two terminal groups each have the same arrangement manner of the terminals 5 as that of the first embodiment, certainly, the effect of reducing the dimension of the terminal seat 10 as a whole is superior in the first embodiment. Referring to FIG. 22 and FIG. 23, similarly, when each terminal group has three terminals 5, the three terminals 5 may be arranged as a triangle.

In conclusion, since the terminal 5 has a pair of resilient arms 52, the terminal 5 can apply a larger normal force, and since the soldering portion 54 is positioned between the two resilient arms 52, a space can be sufficiently used, not only the dimension of the terminal 5 itself can be reduced but also it facilitates arrangement of the plurality of terminals 5 in a stagger manner, and in turn the dimension of the terminal seat 10 is reduced as a whole and the dimension of the electronic card connector 100 is reduced as a whole. Moreover, by that the two oblique portions 132 are respectively positioned on the front side and the rear side of the press portion 131 along the card insertion direction D and each obliquely intersect the card insertion direction D, the resilient press unit 12 of the metal shell 1 can prevent the resilient piece 13 from hooking the tray 2, and thus can allow the tray 2 to move smoothly while the tray 2 is inserted into or ejected from the card insertion space 101.

The above described are only the embodiments of the present disclosure, which cannot limit the scope of the implementation of the present disclosure, that is, simple equivalent variations and modifications made according to the scope of the Claims and the description content of the present disclosure are still fallen within the scope of the present disclosure.

What is claimed is:

1. A terminal seat, comprising:
an insulative body having a plurality of receiving recessed portions; and
a plurality of terminals respectively corresponding to the plurality of receiving recessed portions, each terminal having a fixed unit, a pair of resilient arms, a contact portion and a soldering portion, the fixed unit being fixed to the insulative body, the pair of resilient arms extending from the fixed unit into the corresponding receiving recessed portion in a manner that the pair of resilient arms are spaced apart from each other and are joined with each other at distal ends of the pair of resilient arms, the contact portion being formed at the joint portion of the pair of resilient arms, the soldering portion extending into the corresponding receiving recessed portion from the fixed unit and being positioned between the pair of resilient arms.

2. The terminal seat according to claim 1, wherein the contact portion has a curved shape and protrudes from surfaces of the pair of resilient arms.

3. The terminal seat according to claim 1, wherein the plurality of receiving recessed portions each penetrate the insulative body.

4. The terminal seat according to claim 1, wherein the fixed unit is a rectangular sheet piece, and the pair of resilient arms extend respectively from the fixed unit respectively adjacent to two ends of the fixed unit.

5. The terminal seat according to claim 1, wherein the fixed unit comprises a first sheet body and a second sheet body which are spaced apart from each other, and the first sheet body is connected to one resilient arm and the soldering portion, and the second sheet body is connected to the other resilient arm.

6. The terminal seat according to claim 1, wherein the plurality of terminals are divided into two terminal groups, each terminal group has at least three terminals, the terminals in each terminal group are arranged so that a central position of each terminal is positioned on one apex of a polygon and the contact portions of all the terminals are aligned with a straight line.

7. The terminal seat according to claim 6, wherein each terminal group has three terminals and the central position of each terminal is positioned on one apex of a triangle.

8. The terminal seat according to claim 6, wherein each terminal group has four terminals and the central position of each terminal is positioned on one apex of a quadrilateral.

9. A terminal seat, comprising:
an insulative body having a plurality of receiving recessed portions; and
a plurality of terminals respectively corresponding to the plurality of receiving recessed portions, each terminal having a fixed unit, a pair of resilient arms, a contact portion and a soldering portion, the fixed unit being fixed to the insulative body, the pair of resilient arms extending from the fixed unit into the corresponding receiving recessed portion in a manner that the pair of resilient arms are spaced apart from each other and are jointed with each other at distal ends of the pair of resilient arms, the contact portion being formed at the joint portion of the pair of resilient arms, the soldering portion extending from the fixed unit, the plurality of terminals being divided into two terminal groups, each terminal group having at least three terminals, the terminals in each terminal group being arranged so that a central position of each terminal is positioned on one apex of a polygon and the contact portions of all the terminals are aligned with a straight line.

10. The terminal seat according to claim 9, wherein each terminal group has three terminals and the central position of each terminal is positioned on one apex of a triangle.

11. The terminal seat according to claim 9, wherein each terminal group has four terminals and the central position of each terminal is positioned on one apex of a quadrilateral.

12. An electronic card connector, comprising:
the terminal seat according to claim 1; and
a metal shell cooperatively defining a card insertion space with the terminal seat, and the contact portions of the plurality of terminals protruding toward the card insertion space, the metal shell comprising a top plate which is spaced apart from and faces the insulative body and a resilient press unit which is formed to the top plate, the resilient press unit corresponding to the terminal seat in position and comprising at least a resilient piece, each resilient piece extending from the top plate toward the card insertion space and having a press portion extending into the card insertion space and two oblique portions, the two oblique portions being respectively positioned on a front side and a rear side of the press portion along a card insertion direction and each obliquely intersecting the card insertion direction.

13. The electronic card connector according to claim 12, wherein the press portion is a rectangular shape extending parallel to the card insertion direction, and the two oblique portions are respectively connected to two ends of the press portion.

14. The electronic card connector according to claim 13, wherein each resilient piece further has two protruding portions which each protrude from the press portion toward the card insertion space, and the two protruding portions are respectively positioned close to the two ends of the press portion.

15. The electronic card connector according to claim 12, further comprising another terminal seat, and the two terminal seats being sequentially arranged along the card insertion direction, the metal shell and the two terminal seats cooperatively defining the card insertion space, and the metal shell further comprising another resilient press unit, the two resilient press units corresponding to the two terminal seats respectively in position and being sequentially arranged along the card insertion direction.

16. The terminal seat according to claim 1, wherein the soldering portion extends from the fixed unit into the corresponding receiving recessed portion.

17. The terminal seat according to claim 6, wherein the central position is provided in line with the soldering portion.

18. An electronic card connector, comprising:
the terminal seat according to claim 9; and
a metal shell cooperatively defining a card insertion space with the terminal seat, and the contact portions of the plurality of terminals protruding toward the card insertion space, the metal shell comprising a top plate which is spaced apart from and faces the insulative body and a resilient press unit which is formed to the top plate, the resilient press unit corresponding to the terminal seat in position and comprising at least a resilient piece, each resilient piece extending from the top plate toward the card insertion space and having a press portion extending into the card insertion space and two oblique portions, the two oblique portions being respectively positioned on a front side and a rear side of the press portion along a card insertion direction and each obliquely intersecting the card insertion direction.

19. The terminal seat according to claim 9, wherein the central position is provided in line with the soldering portion.

20. A terminal seat, comprising:
an insulative body having first, second and third receiving recessed portions, each receiving recessed portion being distinct and separated from each of the other receiving recessed portions;
a first terminal having a first fixed unit, a first pair of resilient arms, a first contact portion and a first soldering portion, the first fixed unit is fixed to the insulating body, the first pair of resilient arms extends from the first fixed unit into the first receiving recessed portion and being spaced apart from each other at distal ends thereof, the first contact portion being formed at the joint portion of the first pair of resilient arms, the first soldering portion extending from the first fixed unit and being positioned between the first pair of resilient arms;
a second terminal having a second fixed unit, a second pair of resilient arms, a second contact portion and a second soldering portion, the second fixed unit is fixed to the insulating body, the second pair of resilient arms extends from the second fixed unit into the second receiving recessed portion and being spaced apart from each other at distal ends thereof, the second contact portion being formed at the joint portion of the second pair of resilient arms, the second soldering portion extending from the second fixed unit and being positioned between the second pair of resilient arms; and
a third terminal having a third fixed unit, a third pair of resilient arms, a third contact portion and a third soldering portion, the third fixed unit is fixed to the insulating body, the third pair of resilient arms extends from the third fixed unit into the third receiving recessed portion and being spaced apart from each other at distal ends thereof, the third contact portion being formed at the joint portion of the third pair of resilient arms, the third soldering portion extending from the third fixed unit and being positioned between the third pair of resilient arms.

21. The terminal seat according to claim 20, wherein the insulative body has a fourth receiving recessed portion, and further comprising a fourth terminal having a fourth fixed unit, a fourth pair of resilient arms, a fourth contact portion and a fourth soldering portion, the fourth fixed unit is fixed to the insulating body, the fourth pair of resilient arms extends from the fourth fixed unit into the fourth receiving recessed portion and being spaced apart from each other at distal ends thereof, the fourth contact portion being formed at the joint portion of the fourth pair of resilient arms, the fourth soldering portion extending from the fourth fixed unit and being positioned between the fourth pair of resilient arms.

22. The terminal seat according to claim 21, wherein the first, second, third and fourth terminals are arranged relative to one another such that a central position of each terminal is positioned on one apex of a quadrilateral, and such that the first, second, third and fourth contact portions are aligned along a straight line.

23. The terminal seat according to claim 22, wherein the central position of each terminal is provided in line with the first, second, third and fourth soldering portions, respectively.

24. The terminal seat according to claim 20, wherein the first, second and third terminals are arranged relative to one another such that a central position of each terminal is positioned on one apex of a triangle, and such that the first, second and third contact portions are aligned along a straight line.

25. The terminal seat according to claim 24, wherein the central position of each terminal is provided in line with the first, second and third soldering portions, respectively.

26. The terminal seat according to claim 20, wherein the first, second and third terminals are all configured identical to one another.

27. The terminal seat according to claim 20, wherein each fixed unit is a rectangular sheet piece, and each pair of resilient arms extend respectively from the corresponding fixed unit respectively adjacent to two ends of the corresponding fixed unit.

28. The terminal seat according to claim 20, wherein each fixed unit comprises a first sheet body and a second sheet body which are spaced apart from each other, and each first sheet body is connected to one of the corresponding resilient arms and the corresponding soldering portion, and the second sheet body is connected to the other one of the corresponding resilient arms.

29. An electronic card connector, comprising:
the terminal seat according to claim 20; and
a metal shell cooperatively defining a card insertion space with the terminal seat, and the contact portions of the terminals protruding toward the card insertion space, the metal shell comprising a top plate which is spaced apart from and faces the insulative body and a resilient press unit which is formed to the top plate, the resilient press unit corresponding to the terminal seat in position and comprising at least a resilient piece, each resilient piece extending from the top plate toward the card insertion space and having a press portion extending into the card insertion space and two oblique portions, the two oblique portions being respectively positioned on a front side and a rear side of the press portion along a card insertion direction and each obliquely intersecting the card insertion direction.

* * * * *